(12) United States Patent
Clayton et al.

(10) Patent No.: US 8,788,768 B2
(45) Date of Patent: *Jul. 22, 2014

(54) MAINTAINING MIRROR AND STORAGE SYSTEM COPIES OF VOLUMES AT MULTIPLE REMOTE SITES

(75) Inventors: Nicolas M. Clayton, Warrington (GB); Robert F. Kern, Otter Rock, OR (US); David B. Petersen, Gaithersburg, MD (US); David M. Shackelford, Tucson, AZ (US); Gail A. Spear, Tucson, AZ (US); John G. Thompson, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 875 days.

This patent is subject to a terminal disclaimer.

(21) Appl. No.: 12/894,044

(22) Filed: Sep. 29, 2010

(65) Prior Publication Data

US 2012/0079224 A1    Mar. 29, 2012

(51) Int. Cl.
*G06F 12/00*     (2006.01)
*G06F 11/14*     (2006.01)

(52) U.S. Cl.
CPC ........ *G06F 11/1446* (2013.01); *G06F 11/1448* (2013.01)
USPC ............... 711/162; 711/161; 711/E12.103

(58) Field of Classification Search
CPC ............ G06F 11/1446; G06F 11/1448; G06F 11/1471
See application file for complete search history.

(56) References Cited

U.S. PATENT DOCUMENTS

| | | | |
|---|---|---|---|
| 6,295,591 B1 * | 9/2001 | Bealkowski et al. ......... 711/165 |
| 6,446,175 B1 | 9/2002 | West et al. | |
| 6,502,205 B1 | 12/2002 | Yanai et al. | |
| 6,912,629 B1 | 6/2005 | West et al. | |
| 7,133,884 B1 | 11/2006 | Murley et al. | |
| 7,506,116 B2 | 3/2009 | Haselton et al. | |

(Continued)

FOREIGN PATENT DOCUMENTS

WO       2010002408       1/2010

OTHER PUBLICATIONS

Blunden et al., "Implementing ESS Copy Services on s/390", IBM, Dec. 2000, p. 145-173.

(Continued)

*Primary Examiner* — Reginald Bragdon
*Assistant Examiner* — Thanh D Vo
(74) *Attorney, Agent, or Firm* — David W. Victor; Konrad, Raynes, Davda and Victor LLP

(57) ABSTRACT

Provided are a computer program product and system for maintaining mirror and storage system copies of volumes at multiple remote sites. A first server maintains a mirror copy relationship between a first storage system at a first site and a second storage system at a second site. The first server performs a first point-in-time copy operation from the first storage system to a first storage system copy, wherein the data for the first storage system copy is consistent as of the determined point-in-time. The first server transmits a command to a second server to create a point-in-time copy of the second storage system. The second server processes mirror data transferred from the first server as part of the mirror copy relationship to determine when to create a second point-in-time copy. The second server performs the second point-in-time copy operation.

22 Claims, 6 Drawing Sheets

(56) References Cited

U.S. PATENT DOCUMENTS

| | | | |
|---|---|---|---|
| 2003/0158920 | A1 | 8/2003 | Lynch et al. |
| 2004/0078533 | A1 | 4/2004 | Lee et al. |
| 2004/0123031 | A1 | 6/2004 | Kiselev et al. |
| 2004/0205391 | A1 | 10/2004 | Thompson |
| 2005/0015414 | A1 | 1/2005 | Blea et al. |
| 2005/0038968 | A1* | 2/2005 | Iwamura et al. .............. 711/162 |
| 2006/0005074 | A1 | 1/2006 | Yanai et al. |
| 2006/0182020 | A1 | 8/2006 | Factor et al. |
| 2007/0094467 | A1* | 4/2007 | Yamasaki ..................... 711/162 |
| 2009/0210643 | A1 | 8/2009 | Ashour et al. |

OTHER PUBLICATIONS

Georgens, T., "When Bad Things Happen to Good Companies: Countering the Threat of Enterprise Data Corruption", President, LSI Logic Storage Systems, vol. 4 No. 1, 2001, pp. 76-78.

Management Series, "Delivering Holistic Business Continuity With Auto-Replication", Equallogic Simplifying Networked Storage, 2004, pp. 1-13.

International Business Machines Corporation, "MS/VCR Functional Overview", (online), (retrieved on Aug. 9, 2010), retrieved from the internet at< URL: http://www.redbooks.ibm.com/abstracts/TIPS0585.html?open, 2 pgs.

International Business Machines Corporation, "Mainstar MS/VCR The Tool for Efficient Device Cloning", (online), (retrieved from the internet at <URL http://www.redbooks.ibm.com/redbooks/pdfs/sg246860.pdf, 106 pgs.

U.S. Appl. No. 13/471,231, filed May 14, 2012, entitled "Maintaining Mirror and Storage System Copies of Volumes at Multiple Remote Sites", invented by Nicolas M. Clayton et al., pp. 1-34.

Preliminary amendment dated May 14, 2012, for U.S. Appl. No. 13/471,231, filed May 14, 2012, invented by Nicolas M. Clayton et al., pp. 1-8.

International Business Machines Corporation, "Mainstar MS/VCR The Tool for Efficient Device Cloning", dated Jul. 2005, (online), (retrieved from the internet at <URL http://www.redbooks.ibm.com/redbooks/pdfs/sg246860.pdf, 106 pgs.

Office Action, dated Aug. 20, 2013, for U.S. Appl. No. 13/471,231, filed May 14, 2012, entitled, "Maintaining Mirror and Storage System Copies of Volumes at Multiple Remote Sites", invented by Michele C. Clayton et al., pp. 1-18.

Amendment 1, dated Nov. 20, 2013, for U.S. Appl. No. 13/471,231, filed May 14, 2012, entitled, "Maintaining Mirror and Storage System Copies of Volumes at Multiple Remote Sites", invented by Michele C. Clayton et al., pp. 1-12.

Notice of Allowance dated Mar. 11, 2014, pp. 12, for U.S. Appl. No. 13/471,231, filed May 14, 2012.

* cited by examiner

MAINTAINING MIRROR AND STORAGE SYSTEM COPIES OF VOLUMES AT MULTIPLE REMOTE SITES

BACKGROUND OF THE INVENTION

1. Field of the Invention

The present invention relates to a method, system, and computer program product maintaining mirror and storage system copies of volumes at multiple remote sites.

2. Description of the Related Art

Disaster recovery systems typically address two types of failures, a sudden catastrophic failure at a single point in time or data loss over a period of time. In the second type of gradual disaster, updates to volumes may be lost. To assist in recovery of data updates, a copy of data may be provided at a remote location. Such dual or shadow copies are typically made as the application system is writing new data to a primary storage device. Different copy technologies may be used for maintaining remote copies of data at a secondary site, such as International Business Machine Corporation's ("IBM") Extended Remote Copy (XRC), Peer-to-Peer Remote Copy (PRRC), Global Copy, and Global Mirror Copy. Geographically Dispersed Parallel Sysplex (GDPS™) is an end-to-end Resource Management automated solution that manages storage based data replication solutions, such as those mentioned above, as well as other resources such as servers and workloads. (GDPS is a registered trademark of IBM).

In data mirroring systems, such as PPRC and XRC, data is maintained in volume pairs in a consistency group. A volume pair is comprised of a volume in a primary storage device and a corresponding volume in a secondary storage device that includes an identical copy of the data maintained in the primary volume. Volumes in the primary and secondary storages are consistent when all writes have been transferred in their logical order, i.e., all dependent writes transferred first before the writes dependent thereon. A consistency group has a consistency time for all data writes in a consistency group having a time stamp equal or earlier than the consistency time stamp. A consistency group is a collection of updates to the primary volumes such that dependent writes are secured in a consistent manner. The consistency time is the latest time to which the system guarantees that updates to the secondary volumes are consistent. Consistency groups maintain data consistency across volumes and storage devices. Thus, when data is recovered from the secondary volumes, the recovered data will be consistent. In certain backup systems, a sysplex timer is used to provide a uniform time across systems so that updates written by different applications to different primary storage devices use consistent time-of-day (TOD) values as time stamps. Application systems time stamp data sets when writing such data sets to volumes in the primary storage. The time stamp determines the logical sequence of data updates.

To provide backup of data, a production volume may be mirrored to a backup production volume in the same local site by performing a mirror copy operation. To provide protection from a disaster, the data may also be mirrored to a geographically remote location. In this way, if the primary production volume fails, then the system can failover to using the backup production volume at the local site. However, if both local sites fail or experience a disaster, then production can switch over to the remote site mirror copy. Further, a production site may mirror data to multiple sites, including another local site and a remote site. The local site may further send a directive to the remote site to make a point-in-time copy of the remote site mirror copy. The local site may receive a directive to perform a point-in-time copy operation and forward that directive to the remote site to create a remote point-in-time copy from the remote mirror copy of the data.

SUMMARY

Provided are a computer program product, system, and method for maintaining mirror and storage copies of volumes at multiple remote sites. A first server maintains a mirror copy relationship in a computer readable storage medium between a first storage system at a first site and a second storage system at a second site to mirror data at the first storage system to the second storage system, wherein the first and second sites connect over a network. The first server performs a first point-in-time copy operation from the first storage system to a first storage system copy, wherein the data for the first storage system copy is consistent as of the determined point-in-time, wherein the point-in-time copy operation is completed upon creating a data structure indicating data for the first storage system copy as located at the first storage system or the first storage system copy. The first server transmits a command to a second server to create a point-in-time copy of the second storage system. The second server processes mirror data transferred from the first server as part of the mirror copy relationship to determine when to create a second point-in-time copy from the second storage system to a second storage system copy in response to the command. The second server performs the second point-in-time copy operation, in response to determining from the mirror data to create the second point-in-time copy.

DETAILED DESCRIPTION

Described embodiments provide a system for maintaining duplicate, such as mirror, and point-in-time copies of a first storage system at multiple storage sites to allow recovery from one of the multiple storage sites. A first storage server maintains duplicate or copies of volumes in a first storage system at a first site at a second and third storage systems at a second and third sites. Further, point-in-time copies as of a same point-in-time of the data in the first storage system are created at the first, second and third sites before an event is initiated where operations are performed on the data at the first storage system. Creating the multiple point-in-time copies allows recovery of the data at the first storage system from the first, second or third sites in the event of a failure.

A point-in-time copy replicates data in a manner that appears instantaneous and allows a host to continue accessing the source volume while actual data transfers to the copy volume are deferred to a later time. The point-in-time copy appears instantaneous because complete is returned to the copy operation in response to generating the relationship data structures without copying the data. Point-in-time copy techniques, such as the IBM FlashCopy® (FlashCopy is a registered trademark of International Business Machines, Corp. or "IBM"), typically defer the transfer of a data back to the copy volume until a write operation is requested to that data block on the source volume. Data transfers may also proceed as a background process with minimal impact on system performance. Until the actual data transfer occurs, reads are directed to the data blocks on the source volume. The point-in-time copy relationships that are immediately established in response to the point-in-time copy command include a bitmap or other data structure indicating the location of blocks in the volume at either the source volume or the copy volume.

Figure 1:
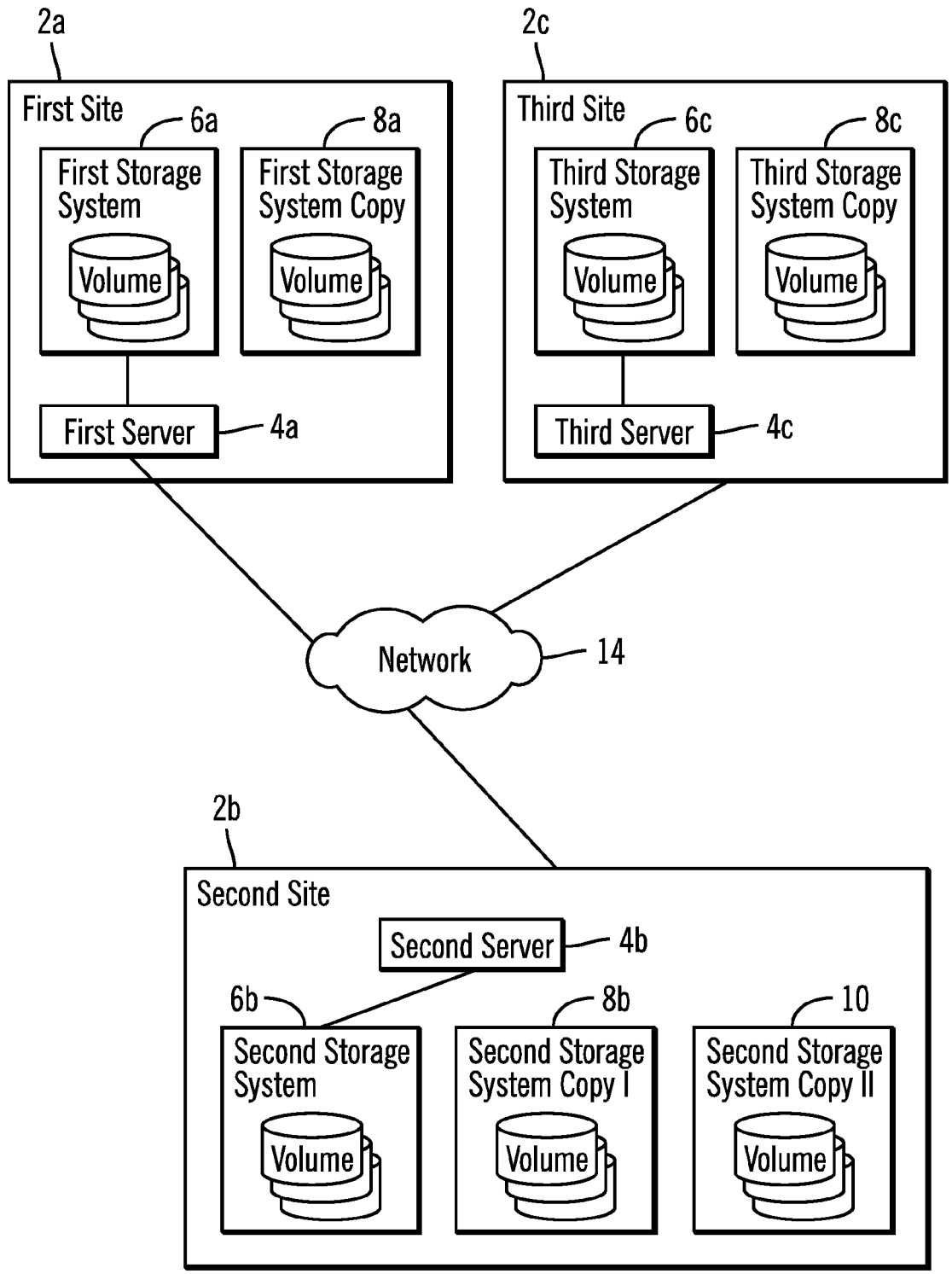
FIG. 1 illustrates an embodiment of a network storage environment.

FIG. 1 illustrates an embodiment of a network storage environment. The environment includes a first 2a, second 2b, and third 2c sites that are in different geographical locations. For instance, the first 2a and third 2c sites may be in proximate locations, such as in the same building or facility or in a same local region. The second site 2b may be more remote with respect to the first 2a and third 2c sites, such as in a different geographical region, different state, time zone etc. In this way the second site 2b may provide for data recovery if there is a failure or disaster involving the first 2a and third 3b sites.

Each site 2a, 2b, 2c includes a server 4a, 4b, 4c and a storage system 6a, 6b, 6c. Each storage system 6a, 6b, 6c includes one or more volumes of data. The servers 4a, 4b, 4c may perform a point-in-time copy operation to create a point-in-time copy of volumes in the storage systems 6a, 6b, 6c resulting in a first storage system copy 8a, second storage system copy (I) 8b, and third storage system copy 8c, respectively. The point-in-time copies 8a, 8b, 8c may have a subset of the volumes in the storage systems 6a, 6b, 6c. The second server 4b may further create an additional second storage system copy II 10 that is a point-in-time copy of the second storage system 6b. A point-in-time copy is established and completed when relationship data structures are created and before any data is copied from the source storage system to the secondary or target storage system. In this way, a point-in-time copy is created almost instantly. Data in a point-in-time copy may be copied over time from the source to target copy when the source data is updated or copied on a deferred basis. The servers 4a, 4b, 4c represent both host and storage server components at the sites 2a, 2b, 2c. For instance, the host server component may execute application programs and initiate jobs with respect to storage system 6a, 6b, 6c and the storage server component may manage I/O operations and copy relationships with respect to the storage systems 6a, 6b, 6c.

The first 4a, second 4b, and third 4c servers may communicate over a network 14. The network 14 may comprise a Local Area Network (LAN), Storage Area Network (SAN), Wide Area Network (WAN), wireless network, etc. The servers 4a, 4b, 4c may comprise an enterprise storage server, storage controller, blade server, general purpose server, desktop computer, workstation, telephony device, personal digital assistant (PDA), etc., or other device used to manage I/O requests to attached storage systems 6a, 6b, 6c.

The storage systems 6a, 6b, 6c and storage system copies 8a, 8b, 8c, 10 may each comprise storage media implemented in one or more storage devices known in the art, such as interconnected hard disk drives (e.g., configured as a DASD, RAID, JBOD, etc.), magnetic tape, solid state storage devices (e.g., EEPROM (Electrically Erasable Programmable Read-Only Memory), flash memory, flash disk, storage-class memory (SCM)), electronic memory, etc. The storage systems 6a, 6b, 6c, 8a, 8b, 8c, 10 may be implemented in a distributed storage environment or network storage environment, such as "cloud" storage. The volumes configured in the storage systems may comprise a logical arrangement of tracks or blocks of data.

Figure 2:
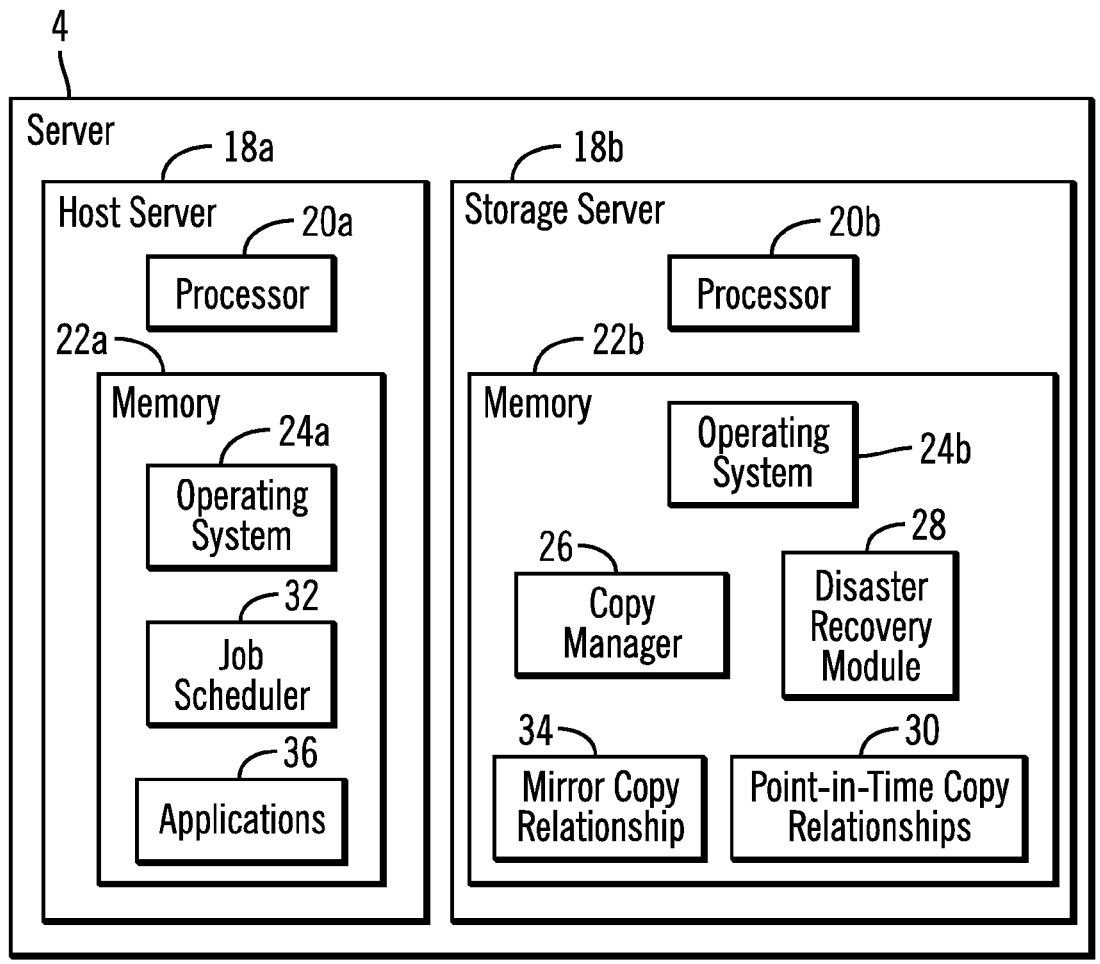
FIG. 2 illustrates an embodiment of a server.

FIG. 2 illustrates an embodiment of a server 4, such as the servers 4a, 4b, and 4c, comprised of a host server 18a and storage server 18b, each having a processor 20a, 20b and a memory 22a, 22b including an operating system 24a, 24b. The memories 22a and 22b may comprise one or more volatile or non-volatile memory devices.

The storage server 18b includes a copy manager 26 to perform data mirroring and create point-in-time copies, a recovery module 28 to handle a failure at one of the sites 2a, 2b, 2c, point-in-time copy relationships 30 providing information on point-in-time copies created by the servers 4a, 4b, 4c, and mirror copy relationship information 34. The point-in-time copy relationships 30 indicate the source volumes 6a, 6b, 6c subject to a point-in-time copy relationship, the target volumes including the point-in-time copy, e.g., 8a, 8b, 8c, 10, and a bitmap or other data structure indicating the location of the point-in-time copy either at the source volume, e.g., 6a, 6b, 6c, or target volume, e.g., 8a, 8b, 8c, 10.

The mirror copy relationship information 34 indicates mirror copies from the first storage system 6a to the second storage system 6b and third storage system 6c. In one embodiment, where the third site 2c is more geographically proximate to the first site 2a than the second site 2b, the mirror copy operations from the first storage system 6a to the more remote second storage system 6b may be asynchronous, where complete to an update request to the first storage system 6a is returned in response to applying the update to the first storage system 6a, but before the update is mirrored to the second storage system 6b, such that the update is mirrored at a later time. The mirror copy operations from the first storage system 6a to the third storage system 6b may be synchronous, such that an update to the first storage system 6a is not complete until the update is also applied to the second storage system 6b.

The copy manager 26 and recovery module 28 may be implemented as one or more software programs loaded into the memory 22 and executed by the processor 20. In an alternative embodiment, the copy manager 26 and recovery module 28 may be implemented with hardware logic, such as an Application Specific Integrated Circuit (ASIC), or as a programmable processor executing code in a computer readable storage medium.

The host server 18a may include a job scheduler 32 to initiate an operation for an event, such as a batch job, on a subset of volumes of the first storage system 6a volumes and applications 36 that submit I/O requests to the storage systems 6a, 6b, 6c. For instance, the event may comprise a batch job operation that applies updates to a production site, a backup operation, defragmentation operation, etc. The job scheduler 32 may comprise a task manager or any other type of program for submitting operations and I/O requests.

The copy manager 26 code in the first 4a and third 4b servers managing the mirror copy relationship therebetween may be implemented using synchronous copy operations, such as a peer-to-peer remote copy (PPRC) program. An example of a PPRC program is the IBM Geographically Dispersed Parallel Sysplex (GDPS)/PPRC copy program that enables the switch of updates from the first storage system 6a to the third storage system 6c. The copy manager 26 implemented in the first server 4a and the second server 4b may implement asynchronous remote copy operations. An example of an asynchronous remote copy program is the IBM GDPS/XRC program where updates to the first storage system 6a is mirrored to the second storage system 6b. The described operations may be implemented with other global recovery programs.

In further embodiments, programs or components described as included in the host server 18a may be implemented in the storage server 18b, and vice versa. Further, the components described in the host server 18a, and storage server 18b may be implemented in a single server.

Figure 3:
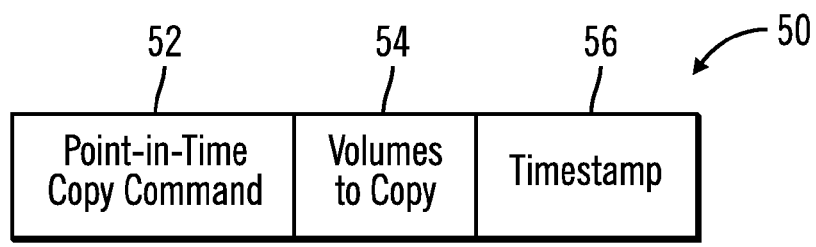
FIG. 3 illustrates an embodiment of a point-in-time command.

FIG. 3 illustrates an embodiment of a point-in-time copy command 50 the first server 4a sends to the second server 4b to create a point-in-time copy of the second storage system 6a. The point-in-time copy command 50 may include a point-in-time copy operand 52, the volumes to copy 54 at the target site and optionally a timestamp 56 at which the data in the point-in-time copy is to be consistent.

In one embodiment, the first storage system 6a comprises a production site and the first server 4a receives I/O requests for the first storage system 6a from remote hosts that connect over the network 14 or from applications within the host server 18a of the first server 4a. The second site 2b and third site 2c provide backup and recovery storage for the first storage system 6a, so that the production site can be recovered from the second storage system 6b or third storage system 6c if the data at the first storage system 6a is no longer accessible.

Figure 4:
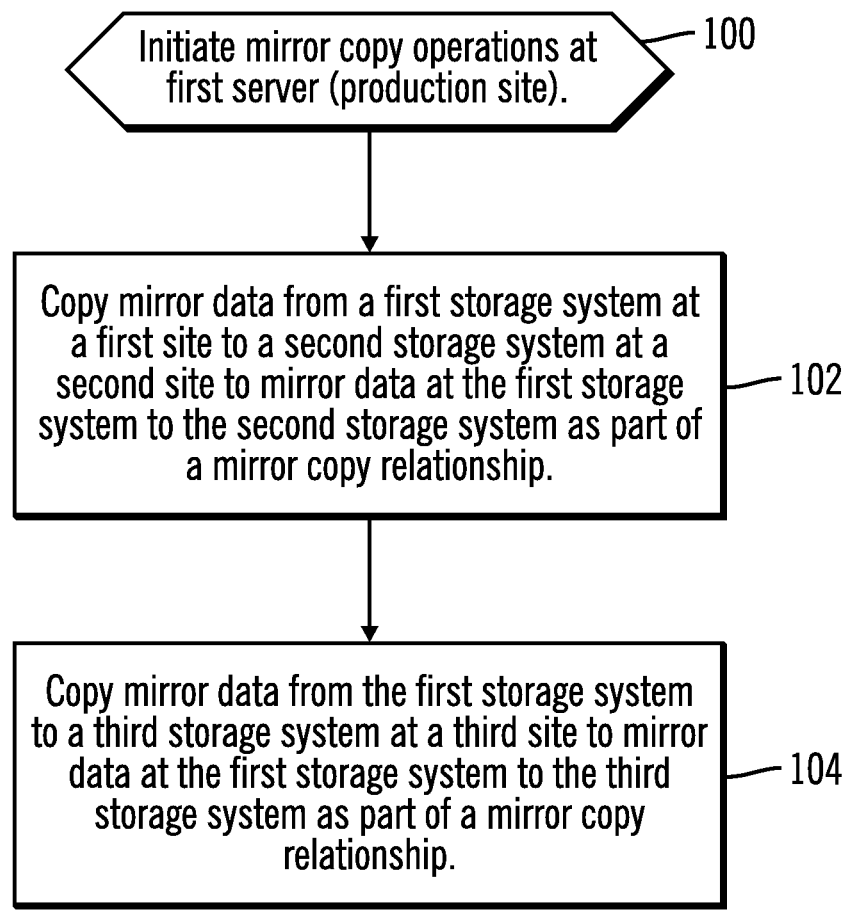
FIG. 4 illustrates an embodiment of operations to maintain mirror copies of a storage at multiple sites.

FIG. 4 illustrates an embodiment of operations performed by the copy manager 26 in the first server 6a to initiate and maintain mirror copy relationships from the first storage system 6a to the second 6b and third 6c storages. In response to initiating (at block 100) mirror copy operations, the copy manager 26 copies (at block 102) mirror data from the first storage system 6a to the second storage system 6b to mirror data at the first storage system 6a as part of a mirror copy relationship 34. The copy manager 26 copies (at block 104) mirror data from the first storage system 6a to the third storage system 6c to mirror data at the first storage system 6a as part of a mirror copy relationship 34. As discussed, the mirror operation to the more remote second site 2b may be asynchronous and the mirror operation to the closer third site 2c may be synchronous.

Figure 5:
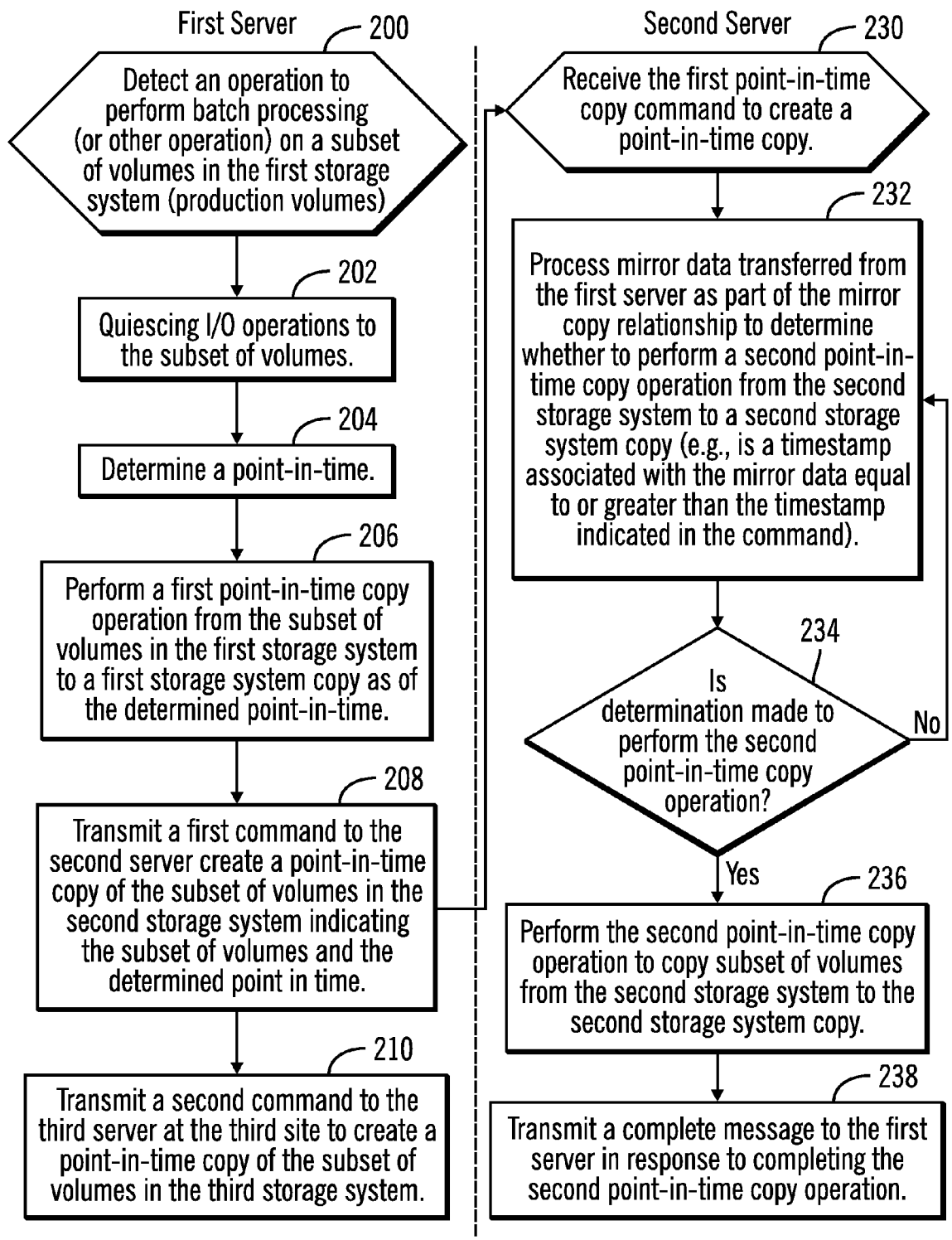
FIGS. 5 and 6 illustrates an embodiment of operations to maintain point-in-time copies of a storage at multiple sites.
Figure 6:
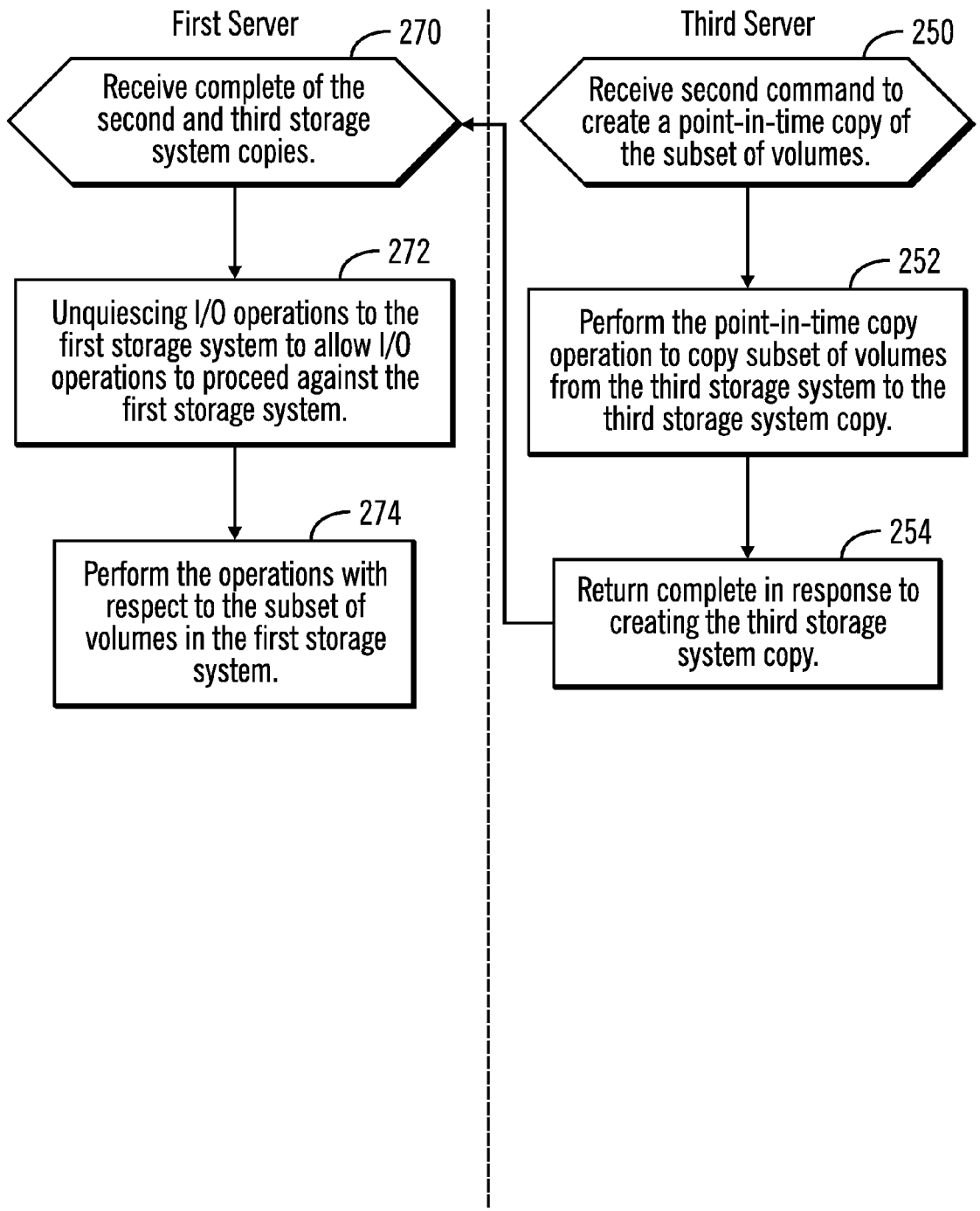

FIGS. 5 and 6 illustrate an embodiment of operations the copy manager 26 program installed at the first 4a, second 4b, and third 4c servers performs to coordinate the creation of mirror and point-in-time copies of the first storage system 6a production site at the second 2b and third 2c sites. The first server 4a begins the copying in response to detecting an event to perform an operation, such as batch processing or another operation, on a subset of volumes in the first storage system 6a (a subset of the production volumes). The first server 4a quiesces (at block 202) all I/O operations of the subset of volumes in the first storage system 6a subject to the detected operation. In one embodiment, the first server 4a may determine (at block 204) a point-in-time for the backup. The first server 4a then performs (at block 206) a first point-in-time copy operation from the subset of volumes in the first storage, such as those subject to the operation, to a first storage system copy 8a as of the determined point-in-time at the same first site 2a. The first server 4a further transmits (at block 208) a first command, such as command 50, to the second server 4b to create a point-in-time copy indicating the subset of volumes 54 to point-in-time copy, and, in certain embodiments, the determined point in time 56 (FIG. 3) The first server 4a further transmits (at block 210) a second command to the third server 4c at the third site 2c to create a point-in-time copy of the subset of volumes in the third storage system 6c. In a synchronous mirroring embodiment, the first and third point-in-time copy operations may comprise an atomic operation, such that the first storage system 6a point-in-time copy to the first storage system copy 8a is not complete until the third storage system copy 8c is confirmed as complete at the third site 2c.

With respect to FIG. 5, upon the copy manager 26 at the second server 4b receiving the first command 50 to create the point-in-time copy, the second server 4b initiates (at block 232) an operation to process mirror data transferred from the first server 4a as part of the mirror copy relationship to determine whether to perform a second point-in-time copy operation from the second storage system 6b to a second storage system copy 8b. In one embodiment where the first command includes a determined timestamp 56 and the mirrored data has a consistency timestamp, then the second server 4b may determine whether a timestamp associated with the mirror data set, such as a consistency group, just transferred is equal to the timestamp 56 indicated in the command. In such an embodiment, the second point-in-time copy operation is performed in response to determining that the timestamp of the mirror data is equal to the timestamp 56 indicated in the command 50 and then mirrored data with timestamps greater than the timestamp 56 can be applied to the second storage system 6a after the second point-in-time copy operation is performed.

In certain embodiments, the first server 4a asynchronously mirrors data from the first storage system 6a at the first site 2a to the second storage system 6b at the site 2b. Extended Remote Copy (XRC) or other asynchronous mirroring technologies may be used by the first server 4a to mirror data to the second site 2b. In such case, the point-in-time copy at the second site 2b needs to occur when the data on the second storage system 6b is I/O consistent to the timestamp 56 sent from the first site 4a. This results in the point-in-time copy at the second site 2b occurring at some real time after the first site 2a point-in-time copy, but at the same logical time that the data was I/O consistent at the first site 2a and is later I/O consistent at the second site 2b following data mirroring. For instance, the first point-in-time copy at the first site 2a occurs at time T1. The first server 4a sends the timestamp 56 indicating T1 to the second server 4b, while all of the data between time T0 & T1 is still being mirrored to the second site 2b. When the second server 4b observes that the mirrored data received at the second site 2b is now at time T2, the second server 4b executes the T1 point-in-time copy after sending notification back to the first server 4a at the first site 2a indicating that the T1 second point-in-time copy has completed at the second site 2b.

In an alternative embodiment, the processing, by the second server 4b, of the mirror data to determine whether to create the second point-in-time copy comprises determining whether a predetermined number of sets, e.g., consistency groups, of mirror data from the first server 4a have been applied to the second storage system 6b after receiving the first command. The second point-in-time copy operation is performed in response to applying the predetermined number of consistency groups to the second storage system 6b after the receiving of the command. Applying a predetermined number of consistency groups ensures that all data in the first storage system 6a at the time of the quiesce operations is mirrored to the second storage system 6b before taking the point-in-time copy to the second storage system copy 8b. In this embodiment, the command 50 may not include the timestamp 54.

If (at block 234) the determination is made to perform the second point-in-time copy, then the second server 4b performs (at block 236) the second point-in-time copy operation to copy a subset of volumes from the second storage system 6b to the second storage system copy 6c. After completing the second point-in-time copy, the second server 4b (at block 238) sends a complete message to the first command to the first server 4a. If (at block 234) a determination is made to not perform the second point-in-time copy, then control proceeds back to block 232 to continue processing sets of mirror data from the first server 4a until the condition for taking the point-in-time copy is detected. The decision to continue processing the mirror data (from the no branch of block 234) may be performed in response to determining that the timestamp of the mirror data is less than the timestamp included with the command or in response to not applying the predetermined number of mirror data sets after receiving the first point-in-time copy command.

With respect to FIG. 6, the copy manager 26 in the third server 4c receives (at block 250) the second point-in-time copy command, which may be part of a synchronous point-in-time copy operation at the first storage system 6a, to create a point-in-time copy of the subset of volumes at the third storage system 6b. In response to the second point-in-time copy command, the third server 4c performs (at block 252) the point-in-time copy operation to copy subset of volumes from the third storage system 6c to the third storage 8c copy. The third server 4c returns (at block 254) complete to the second command.

With respect to FIG. 6, after the first server 4a receives (at block 270) complete of the second 8b and third 8c point-in-time copies, and completes the first storage system copy 8a, the first server 4a unquiesces (at block 272) I/O operations to the first storage to allow I/O operations to proceed against the subset of volumes in the first storage system 6a now that the first 2a, second 2b and third 2c sites have a point-in-time copies 8a, 8b, 8c having the same data consistent as of a same point-in-time when the I/Os to the first storage system 6a was quiesced. The first server 4a may then perform (at block 274) the operations with respect to the subset of volumes in the first storage system 6a which were the subject of the point-in-time copies 8a, 8b, 8c. In described embodiments, the point-in-time copies may occur without disrupting the mirroring of data to volumes, other than the subset of volumes subject to the quiesce, to the second 6b and third 6c storages.

When issuing the second and/or third commands to the second 4b and/or third 4c servers, the first server 4a may send just one command or may send multiple point-in-time commands for the subset of volumes, such as one point-in-time command for each volume of the subset of volumes.

Figure 7:
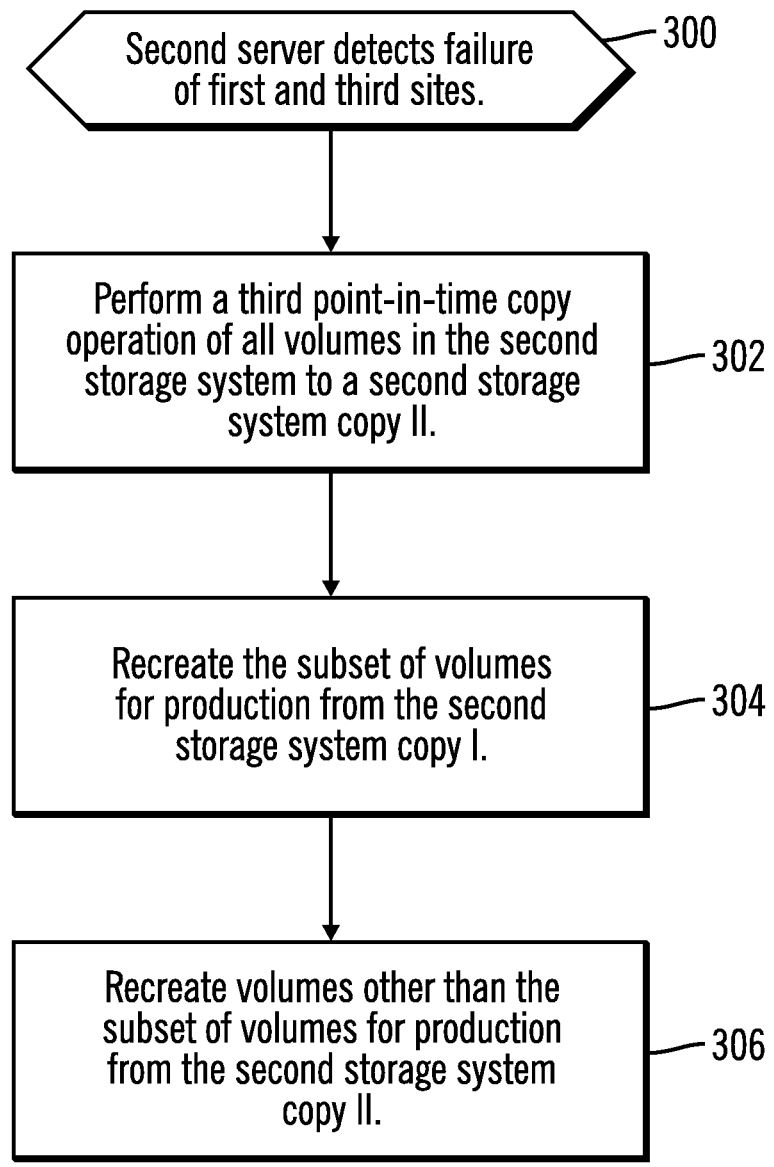
FIG. 7 illustrates an embodiment of operations to recover a storage system from a remote storage site.

FIG. 7 illustrates an embodiment of operations performed in the recovery module 28 of the second server 4b to handle a failure at the first 2a and third 2c sites. In one embodiment, if the production storage can be recovered from the third site 2c, then that is preferred in embodiments where the third site 2c is closer to the first site 2a than the second site 2b. Upon detecting (at block 300) the failure, the second server 4b performs (at block 302) a third point-in-time copy operation of all volumes in the second storage system 6b to a second storage system copy II 10. The second storage system copy II 10 may have more recent data mirrored to the second storage system 6b, such as data mirrored after quiescing I/Os to the subset of volumes at the first storage system 6a, than the second storage system copy I 8c, which is consistent as of the point-in-time of the quiescing at the first storage system 6a. To recover the production site from the second site 2a, the second server 4b recreates (at block 304) the subset of volumes for production from the second storage system copy I 8b and recreates (at block 306) volumes other than the subset of volumes, subject to the operation, such as a batch operation, from the second storage system copy II 10 to recreate data mirrored after the quiesce operation.

With the operations of FIG. 7, the recovered production storage at the third site 2c has data in the subset of volumes subject to the operation consistent as of the point-in-time before the event operation, such as a batch operation, is applied and has data for other volumes consistent as of the last received mirror data set. Further, if there is a failure during the event operation, then the operations of FIG. 7 may be performed to place the subset of volumes in the state before the event operations began. After recovering the production data, the event operation may be performed on the recovered production volume. Additionally, the first server 4a may create point-in-time copies at the second 2b and third 2c sites after event operations complete successfully using the operations of FIGS. 5 and 6.

After recovering the production volume from the point-in-time copies 8c and 10 at the third site 2c, commands may be issued to make the recovered production volume the primary production volume to which system requests are directed. Alternatively, the recovered production volumes may be copied to the production storage system 6a.

In certain embodiments, the server may provide the ability, such as in the copy manager, to extract a logical portion or portions of the contents of the data from a physical volume image. (for example extracting a single data set/file, multiple data sets/files or all data sets/files from a physical image backup of the volume) Further, the described embodiments may also compliment such functionality by providing the ability to take volume images for any and all events, not just locally, also at remote locations in an automated fashion.

In further embodiments, the point-in-time copy taken on the first site and third site may be of a logical portion of the involved volumes such as a file, dataset or other logical entity. The copy taken at the third site might however be a full copy of the involved volumes and could use the previously mentioned ability to extract the required logical portions in the case of a recovery at the second site.

Described embodiments provide techniques to mirror data at multiple sites and create point-in-time copies at multiple sites to use in the event of a failure at the primary site. The copy manager 6 program implemented in the different servers 4a, 4b, 4c may coordinate the creation of the point-in-time copies to ensure they all are consistent as of the same time. Consistency is maintained even if certain of the sites have asynchronous data replication, such as at the second site 2b, where data updates may be behind in time with respect to the first 2a and third 2c sites where mirroring of data is synchronous. Further described embodiments provide coordination with a job scheduler or other program applying updates to the production storage system 6a to provide consistent copies at all sites 2a, 2b, 2c before a job is scheduled.

The described operations may be implemented as a method, apparatus or computer program product using standard programming and/or engineering techniques to produce software, firmware, hardware, or any combination thereof. Accordingly, aspects of the embodiments may take the form of an entirely hardware embodiment, an entirely software embodiment (including firmware, resident software, microcode, etc.) or an embodiment combining software and hardware aspects that may all generally be referred to herein as a "circuit," "module" or "system." Furthermore, aspects of the embodiments may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

Further, although process steps, method steps, algorithms or the like may be described in a sequential order, such processes, methods and algorithms may be configured to work in alternate orders. In other words, any sequence or order of steps that may be described does not necessarily indicate a requirement that the steps be performed in that order. The steps of processes described herein may be performed in any order practical. Further, some steps may be performed simultaneously.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

The illustrated operations of FIGS. 4-7 show certain events occurring in a certain order. In alternative embodiments, certain operations may be performed in a different order, modified or removed. Moreover, steps may be added to the above described logic and still conform to the described embodiments. Further, operations described herein may occur sequentially or certain operations may be processed in parallel. Yet further, operations may be performed by a single processing unit or by distributed processing units.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims herein after appended.

What is claimed is:

1. A computer program product for maintaining copies of data in a first storage system at a first site and a second storage system at a second site, the computer program product comprising at least one non-transitory computer readable storage device including first program code and second program code, wherein the first program code is executed in a first server at the first site and the second program code is executed at a second server at the second site, wherein the first program code and second program code execute to perform operations, the operations comprising:

maintaining, by the first program code, a mirror copy relationship between the first storage system and the second storage system to mirror data at the first storage system to the second storage system, wherein the first and second sites connect over a network;

performing, by the first program code, a first point-in-time copy operation from the first storage system to a first storage system copy, wherein the data for the first storage system copy is consistent as of the determined point-in-time, wherein the point-in-time copy operation is completed upon creating a data structure indicating data for the first storage system copy as located at the first storage system or the first storage system copy;

determining, by the first program code, a timestamp, wherein the first storage system copy is consistent as of the determined timestamp;

transmitting, by the first program code, a command to the second server to create a point-in-time copy of the second storage system that indicates the determined timestamp;

processing, by the second program code, mirror data transferred from the first server as part of the mirror copy relationship to determine whether a timestamp associated with the mirror data applied to the second storage system is equal to the timestamp indicated in the command in response to the command; and performing, by the second program code, a second point-in-time copy operation, in response to determining that the timestamp of the mirror data is equal to the timestamp indicated in the command from the mirror data to create the second point-in-time copy.

2. The computer program product of claim 1, wherein the first point-in-time copy operation copies a subset of volumes in the first storage system to the first storage system copy, wherein the command to create the point-in-time copy indicates the subset of volumes, and wherein the second point-in-time copy operation copies the indicated subset of volumes in the second storage system to the second storage system copy.

3. The computer program product of claim 1, wherein the operations further comprise:

transmitting, by the second program code, a complete message to the first server in response to completing the second point-in-time copy operation; and initiating, by the first program code, a requested operation in response to receiving the complete message from the second server and completing the first point-in-time copy operation.

4. The computer program product of claim 3, wherein the first server performs the first point-in-time copy operation and transmits the command to create the point-in-time copy in response to receiving the requested operation.

5. The computer program product of claim 4, wherein the requested operation is performed in response to an event, wherein the requested operation for the event processes a subset of volumes in the first storage system, wherein the first point-in-time copy operation copies the subset of volumes in the first storage system to the first storage system copy, wherein the command to create the point-in-time copy indicates the subset of volumes, and wherein the second point-in-time copy operation copies the indicated subset of volumes in the second storage system to the second storage system copy.

6. The computer program product of claim 3, wherein the operations further comprise:

quiescing, by the first program code, I/O operations at the first storage system, wherein the operations of performing the first point-in-time copy operation and transmitting the command to create the point-in-time copy are performed after the quiescing of I/O operations; and allowing, by the first program code, I/O operations to proceed against the first storage system in response to receiving the complete message and completing the first storage system copy.

7. The computer program product of claim 1, wherein mirror data from the first storage system to the second storage system is sent in consistency groups having data that is consistent as of a point in time, wherein the processing, by the second program code, of the mirror data to determine whether to create the second point-in-time copy comprises determining whether a predetermined number of consistency groups of mirror data from the first server have been applied to the second storage system after receiving the command, wherein the second point-in-time copy operation is performed in response to applying the predetermined number of consistency groups to the second storage system after the receiving of the command.

8. The computer program product of claim 1, wherein the first server is further in communication with a third server and third storage system at a third site, wherein the command comprises a first command and the mirror copy relationship between the first storage system and the second storage system comprises a first mirror copy relationship, wherein the at least one computer readable storage media further includes third program code executed in the third server, wherein the first program code and third program code are executed to perform operations, the operations comprising:

maintaining, by the first program code, a second mirror copy relationship between the first storage system and the third storage system to mirror data at the first storage system to the third storage system, wherein the first and the third sites connect over a network, and wherein the third site is more geographically proximate to the first site than the second site;

transmitting, by the first program code, a second command to the third server at the third site to create a point-in-time copy; and performing, by the third program code, a third point-in-time copy operation from the third storage system to a third storage system copy in response to the second command.

9. The computer program product of claim 8, wherein the first storage system copy, second storage system copy, and third storage system copy have same data consistent as of a same point-in-time.

10. The computer program product of claim 1, wherein the first and second storage systems are comprised of volumes, wherein the operations further comprise:
   detecting, by the second computer code, a failure at the first site;
   performing, by the second program code, a third point in time copy operation, in response to detecting the failure at the first site, from the second storage system to a third storage system copy, wherein the third storage system copy has data dated later than data in the second storage system copy, and wherein the second storage system copy includes a subset of volumes in the third storage system copy; and
   recreating, by the first program code, a recreated first storage system previously at the failed first site from the second and third storage system copies.

11. The computer program product of claim 10, wherein the first storage system copy and second storage system copy comprise point-in-time copies of a subset of volumes in the first and second storage systems, respectively, wherein recreating the recreated first storage system from the second and third storage system copies comprises:
   recreating the subset of volumes in the second storage system from the second storage system copy; and
   recreating volumes from the third storage system copy that are other than the subset of volumes recreated from the second storage system copy.

12. A system comprising a first server at a first site coupled to a first storage system at the first site and a second server at a second site, wherein the first and second sites connect over a network, wherein the second server is coupled to a second storage system at the second site, comprising:
   a processor; and
   a computer readable storage medium having code executed by the processor to perform operations, the operations comprising:
   maintaining a mirror copy relationship in the computer readable storage medium between the first storage system and the second storage system to mirror data at the first storage system to the second storage system;
   performing a first point-in-time copy operation from the first storage system to a first storage system copy, wherein the data for the first storage system copy is consistent as of the determined point-in-time, wherein the point-in-time copy operation is completed upon creating a data structure indicating data for the first storage system copy as located at the first storage system or the first storage system copy;
   determining a timestamp, wherein the first storage system copy is consistent as of the determined timestamp;
   transmitting a command to the second server to create a point-in-time copy of the second storage system that indicates the determined timestamp, wherein the command causes the second server to process mirror data transferred from the first server as part of the mirror copy relationship to determine whether a timestamp associated with the mirror data applied to the second storage system is equal to the timestamp indicated in the command in response to the command, and wherein the second server performs a second point-in-time copy operation in response to determining that the timestamp of the mirror data is equal to the timestamp indicated in the command.

13. The system of claim 12, wherein the operations further comprise:
   receiving from the second server a complete message indicating that the second server completed the second point-in-time copy operation; and
   initiating a requested operation in response to receiving the complete message from the second server and completing the first point-in-time copy operation.

14. The system of claim 13, wherein the operations further comprise:
   quiescing I/O operations at the first storage system, wherein the operations of performing the first point-in-time copy operation and transmitting the command to create the point-in-time copy are performed after the quiescing of I/O operations; and
   allowing I/O operations to proceed against the first storage system in response to receiving the complete message and completing the first storage system copy.

15. The system of claim 13, wherein the first server performs the first point-in-time copy operation and transmits the command to create the point-in-time copy in response to receiving the requested operation.

16. The system of claim 15, wherein the requested operation is performed in response to an event, wherein the requested operation for the event processes a subset of volumes in the first storage system, wherein the first point-in-time copy operation copies the subset of volumes in the first storage system to the first storage system copy, wherein the command to create the point-in-time copy indicates the subset of volumes, and wherein the second point-in-time copy operation copies the indicated subset of volumes in the second storage system to the second storage system copy.

17. The system of claim 12, wherein mirror data from the first storage system to the second storage system is sent in consistency groups having data that is consistent as of a point in time, and wherein the second server processes the mirror data to determine whether to create the second point-in-time copy by determining whether a predetermined number of consistency groups of mirror data from the first server have been applied to the second storage system after receiving the command, wherein the second point-in-time copy operation is performed in response to applying the predetermined number of consistency groups to the second storage system after the receiving of the command.

18. The system of claim 12, wherein the first point-in-time copy operation copies a subset of volumes in the first storage system to the first storage system copy, wherein the command to create the point-in-time copy indicates the subset of volumes, and wherein the second point-in-time copy operation copies the indicated subset of volumes in the second storage system to the second storage system copy.

19. The system of claim 12, wherein the first server is further in communication with a third server and third storage system at a third site, wherein the command comprises a first command and the mirror copy relationship between the first storage system and the second storage system comprises a first mirror copy relationship, wherein the computer readable storage media further includes third program code executed in the third server, wherein the first program code and third program code are executed to perform operations, the operations comprising:
   maintaining, by the first program code, a second mirror copy relationship between the first storage system and the third storage system to mirror data at the first storage system to the third storage system, wherein the first and the third sites connect over a network, and wherein the third site is more geographically proximate to the first site than the second site;

transmitting, by the first program code, a second command to the third server at the third site to create a point-in-time copy; and performing, by the third program code, a third point-in-time copy operation from the third storage system to a third storage system copy in response to the second command.

20. The system of claim 12, wherein the first and second storage systems are comprised of volumes, wherein the operations further comprise:

detecting, by the second computer code, a failure at the first site;

performing, by the second program code, a third point in time copy operation, in response to detecting the failure at the first site, from the second storage system to a third storage system copy, wherein the third storage system copy has data dated later than data in the second storage system copy, and wherein the second storage system copy includes a subset of volumes in the third storage system copy; and recreating, by the first program code, a recreated first storage system previously at the failed first site from the second and third storage system copies.

21. The method of claim 20, wherein the first storage system copy and second storage system copy comprise point-in-time copies of a subset of volumes in the first and second storage systems, respectively, wherein recreating the recreated first storage system from the second and third storage system copies comprises:

recreating the subset of volumes in the second storage system from the second storage system copy; and recreating volumes other than the subset of volumes from the third storage system copy that are other than the subset of volumes recreated from the second storage system copy.

22. A system in communication with a network, comprising, a first server and a first storage system at a first site;

a second server and a second storage system at a second site;

a third server and a third storage system at a third site, wherein the first server, second server, and third server communicate over the network;

wherein the first server includes first program code executed to perform operations, the operations comprising:

maintaining a first mirror copy relationship between the first storage system and the second storage system to mirror data at the first storage system to the second storage system;

maintaining a second mirror copy relationship between the first storage system and the third storage system to mirror data at the first storage system to the third storage system, wherein the third site is more geographically proximate to the first site than the second site;

performing a first point-in-time copy operation from the first storage system to a first storage system copy, wherein the data for the first storage system copy is consistent as of the determined point-in-time, wherein the point-in-time copy operation is completed upon creating a data structure indicating data for the first storage system copy as located at the first storage system or the first storage system copy;

determining a timestamp, wherein the first storage system copy is consistent as of the determined timestamp;

transmitting a first command to the second server to create a point-in-time copy of the second storage system that indicates the determined timestamp;

transmitting a second command to a third server at the third site to create a point-in-time copy; and wherein the second server includes second program code executed to perform operations, the operations comprising:

processing mirror data transferred from the first server as part of the mirror copy relationship to determine whether a timestamp associated with the mirror data applied to the second storage system is equal to the timestamp indicated in the first command in response to the first command; and performing a second point-in-time copy operation in response to determining that the timestamp of the mirror data is equal to the timestamp indicated in the first command;

wherein the third server includes third program code executed to perform a third point-in-time copy operation from the third storage system to a third storage system copy in response to the second command.

* * * * *